United States Patent
Liu et al.

(10) Patent No.: US 10,771,621 B2
(45) Date of Patent: Sep. 8, 2020

(54) ACOUSTIC ECHO CANCELLATION BASED SUB BAND DOMAIN ACTIVE SPEAKER DETECTION FOR AUDIO AND VIDEO CONFERENCING APPLICATIONS

(71) Applicant: Cisco Technology, Inc., San Jose, CA (US)

(72) Inventors: Fuling Liu, San Jose, CA (US); Eric Chen, Palo Alto, CA (US); Wei Li, Cupertino, CA (US); Wei-Lien Hsu, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 80 days.

(21) Appl. No.: 15/943,336

(22) Filed: Apr. 2, 2018

(65) Prior Publication Data

US 2019/0132452 A1 May 2, 2019

Related U.S. Application Data

(60) Provisional application No. 62/579,623, filed on Oct. 31, 2017.

(51) Int. Cl.
*H04M 3/00* (2006.01)
*H04M 9/08* (2006.01)
(Continued)

(52) U.S. Cl.
CPC ......... *H04M 3/002* (2013.01); *G10L 21/0208* (2013.01); *G10L 25/48* (2013.01);
(Continued)

(58) Field of Classification Search
None
See application file for complete search history.

(56) References Cited

U.S. PATENT DOCUMENTS

| 4,460,807 A | 7/1984 | Kerr et al. |
| 4,890,257 A | 12/1989 | Anthias et al. |

(Continued)

FOREIGN PATENT DOCUMENTS

| CN | 101055561 | 10/2007 |
| CN | 102572370 | 7/2012 |

(Continued)

OTHER PUBLICATIONS

Hamidia et al., "Impact of Acoustic Echo Cancellation on Speaker Verification in Mobile Environment," researchgate.net, 2nd International Conference on Signal, Image, Vision and their Applications (SIVA '13), Nov. 18-20, 2013, pp. 1-6.

(Continued)

*Primary Examiner* — Antim G Shah
(74) *Attorney, Agent, or Firm* — Polsinelli PC

(57) ABSTRACT

Systems, methods, and devices are disclosed for detecting an active speaker in a two-way conference. Real time audio in one or more sub band domains are analyzed according to an echo cancellor model. Based on the analyzed real time audio, one or more audio metrics are determined from output from an acoustic echo cancellation linear filter. The one or more audio metrics are weighted based on a priority, and a speaker status is determined based on the weighted one or more audio metrics being analyzed according to an active speaker detection model. For an active speaker status, one or more residual echo or noise is removed from the real time audio based on the one or more audio metrics.

19 Claims, 7 Drawing Sheets

(51) Int. Cl.
*G10L 21/0208* (2013.01)
*H04M 3/56* (2006.01)
*G10L 25/48* (2013.01)

(52) U.S. Cl.
CPC ........... *H04M 3/568* (2013.01); *H04M 9/082* (2013.01); *G10L 2021/02082* (2013.01)

(56) References Cited

U.S. PATENT DOCUMENTS

| | | |
|---|---|---|
| 5,694,563 A | 12/1997 | Belfiore et al. |
| 5,699,082 A | 12/1997 | Marks et al. |
| 5,745,711 A | 4/1998 | Kitahara et al. |
| 5,767,897 A | 6/1998 | Howell |
| 5,825,858 A | 10/1998 | Shaffer et al. |
| 5,874,962 A | 2/1999 | de Judicibus et al. |
| 5,995,096 A | 11/1999 | Kitahara et al. |
| 6,040,817 A | 3/2000 | Sumikawa |
| 6,075,531 A | 6/2000 | DeStefano |
| 6,085,166 A | 7/2000 | Beckhardt et al. |
| 6,191,807 B1 | 2/2001 | Hamada et al. |
| 6,300,951 B1 | 10/2001 | Filetto et al. |
| 6,392,674 B1 | 5/2002 | Hiraki et al. |
| 6,463,473 B1 | 10/2002 | Gubbi |
| 6,554,433 B1 | 4/2003 | Holler |
| 6,573,913 B1 | 6/2003 | Butler et al. |
| 6,646,997 B1 | 11/2003 | Baxley et al. |
| 6,665,396 B1 | 12/2003 | Khouri et al. |
| 6,711,419 B1 | 3/2004 | Mori |
| 6,754,321 B1 | 6/2004 | Innes et al. |
| 6,754,335 B1 | 6/2004 | Shaffer et al. |
| RE38,609 E | 10/2004 | Chen et al. |
| 7,046,794 B2 | 5/2006 | Piket et al. |
| 7,058,164 B1 | 6/2006 | Chan et al. |
| 7,058,710 B2 | 6/2006 | McCall et al. |
| 7,062,532 B1 | 6/2006 | Sweat et al. |
| 7,085,367 B1 | 8/2006 | Lang |
| 7,124,164 B1 | 10/2006 | Chemtob |
| 7,149,499 B1 | 12/2006 | Oran et al. |
| 7,180,993 B2 | 2/2007 | Hamilton |
| 7,209,475 B1 | 4/2007 | Shaffer et al. |
| 7,418,664 B2 | 8/2008 | Ben-Shachar et al. |
| 7,441,198 B2 | 10/2008 | Dempski et al. |
| 7,478,339 B2 | 1/2009 | Pettiross et al. |
| 7,530,022 B2 | 5/2009 | Ben-Shachar et al. |
| 7,620,902 B2 | 11/2009 | Manion et al. |
| 7,634,533 B2 | 12/2009 | Rudolph et al. |
| 7,792,277 B2 | 9/2010 | Shaffer et al. |
| 7,881,450 B1 | 2/2011 | Gentle et al. |
| 7,920,160 B2 | 4/2011 | Tamaru et al. |
| 7,956,869 B1 | 6/2011 | Gilra |
| 8,059,557 B1 | 11/2011 | Sigg et al. |
| 8,081,205 B2 | 12/2011 | Baird et al. |
| 8,274,893 B2 | 9/2012 | Bansal et al. |
| 8,290,998 B2 | 10/2012 | Stienhans et al. |
| 8,340,268 B2 | 12/2012 | Knaz |
| 8,358,327 B2 | 1/2013 | Duddy |
| 8,428,234 B2 | 4/2013 | Knaz |
| 8,433,061 B2 | 4/2013 | Cutler |
| 8,434,019 B2 | 4/2013 | Nelson |
| 8,456,507 B1 | 6/2013 | Mallappa et al. |
| 8,462,103 B1 | 6/2013 | Moscovitch et al. |
| 8,478,848 B2 | 7/2013 | Minert |
| 8,630,208 B1 | 1/2014 | Kjeldaas |
| 8,638,354 B2 | 1/2014 | Leow et al. |
| 8,675,847 B2 | 3/2014 | Shaffer et al. |
| 8,694,587 B2 | 4/2014 | Chaturvedi et al. |
| 8,694,593 B1 | 4/2014 | Wren et al. |
| 8,706,539 B1 | 4/2014 | Mohler |
| 8,831,505 B1 | 9/2014 | Seshadri |
| 8,890,924 B2 | 11/2014 | Wu |
| 8,892,646 B2 | 11/2014 | Chaturvedi et al. |
| 8,924,862 B1 | 12/2014 | Luo |
| 8,930,840 B1 | 1/2015 | Riskó et al. |
| 9,031,839 B2 | 5/2015 | Thorsen et al. |
| 9,032,028 B2 | 5/2015 | Davidson et al. |
| 9,118,612 B2 | 8/2015 | Fish et al. |
| 9,131,017 B2 | 9/2015 | Kurupacheril et al. |
| 9,137,376 B1 | 9/2015 | Basart et al. |
| 9,143,729 B2 | 9/2015 | Anand et al. |
| 9,197,701 B1 | 11/2015 | Petrov et al. |
| 9,197,848 B2 | 11/2015 | Felkai et al. |
| 9,201,527 B2 | 12/2015 | Kripalani et al. |
| 9,204,099 B2 | 12/2015 | Brown |
| 9,268,398 B2 | 2/2016 | Tipirneni |
| 9,298,342 B2 | 3/2016 | Zhang et al. |
| 9,323,417 B2 | 4/2016 | Sun et al. |
| 9,335,892 B2 | 5/2016 | Ubillos |
| 9,349,119 B2 | 5/2016 | Desai et al. |
| 9,367,224 B2 | 6/2016 | Ananthakrishnan et al. |
| 9,369,673 B2 | 6/2016 | Ma et al. |
| 9,407,621 B2 | 8/2016 | Vakil et al. |
| 9,432,512 B2 | 8/2016 | You |
| 9,449,303 B2 | 9/2016 | Underhill et al. |
| 9,495,664 B2 | 11/2016 | Cole et al. |
| 9,516,022 B2 | 12/2016 | Borzycki et al. |
| 9,525,711 B2 | 12/2016 | Ackerman et al. |
| 9,553,799 B2 | 1/2017 | Tarricone et al. |
| 9,563,480 B2 | 2/2017 | Messerli et al. |
| 9,609,030 B2 | 3/2017 | Sun et al. |
| 9,614,756 B2 | 4/2017 | Joshi |
| 9,640,194 B1 | 5/2017 | Nemala et al. |
| 9,667,799 B2 | 5/2017 | Olivier et al. |
| 9,762,709 B1 | 9/2017 | Snyder et al. |
| 2002/0018051 A1 | 2/2002 | Singh |
| 2002/0076003 A1 | 6/2002 | Zellner et al. |
| 2002/0078153 A1 | 6/2002 | Chung et al. |
| 2002/0188522 A1 | 12/2002 | McCall et al. |
| 2003/0028647 A1 | 2/2003 | Grosu |
| 2003/0046421 A1 | 3/2003 | Horvitz et al. |
| 2003/0174826 A1 | 9/2003 | Hesse |
| 2003/0195745 A1* | 10/2003 | Zinser, Jr. ............ G10L 19/173 704/219 |
| 2003/0197739 A1 | 10/2003 | Bauer |
| 2003/0227423 A1 | 12/2003 | Arai et al. |
| 2004/0054885 A1 | 3/2004 | Bartram et al. |
| 2004/0098456 A1 | 5/2004 | Krzyzanowski et al. |
| 2004/0210637 A1 | 10/2004 | Loveland |
| 2004/0267938 A1 | 12/2004 | Shoroff et al. |
| 2005/0014490 A1 | 1/2005 | Desai et al. |
| 2005/0055405 A1 | 3/2005 | Kaminsky et al. |
| 2005/0055412 A1 | 3/2005 | Kaminsky et al. |
| 2005/0085243 A1 | 4/2005 | Boyer et al. |
| 2005/0099492 A1 | 5/2005 | Orr |
| 2005/0108328 A1 | 5/2005 | Berkeland et al. |
| 2005/0215229 A1 | 9/2005 | Cheng |
| 2006/0004911 A1 | 1/2006 | Becker et al. |
| 2006/0026255 A1 | 2/2006 | Malamud et al. |
| 2006/0164552 A1 | 7/2006 | Cutler |
| 2006/0224430 A1 | 10/2006 | Butt |
| 2006/0250987 A1 | 11/2006 | White et al. |
| 2007/0005752 A1 | 1/2007 | Chawla et al. |
| 2007/0041366 A1 | 2/2007 | Vugenfirer et al. |
| 2007/0091831 A1 | 4/2007 | Croy et al. |
| 2007/0100986 A1 | 5/2007 | Bagley et al. |
| 2007/0116225 A1 | 5/2007 | Zhao et al. |
| 2007/0139626 A1 | 6/2007 | Saleh et al. |
| 2007/0198637 A1 | 8/2007 | Deboy et al. |
| 2007/0250567 A1 | 10/2007 | Graham et al. |
| 2008/0068447 A1 | 3/2008 | Mattila et al. |
| 2008/0080532 A1 | 4/2008 | O'Sullivan et al. |
| 2008/0209452 A1 | 8/2008 | Ebert et al. |
| 2009/0012963 A1 | 1/2009 | Johnson et al. |
| 2009/0100142 A1 | 4/2009 | Stern et al. |
| 2009/0147942 A1* | 6/2009 | Culter .................. H04M 9/082 379/406.06 |
| 2009/0193327 A1 | 7/2009 | Roychoudhuri et al. |
| 2009/0254619 A1 | 10/2009 | Kho et al. |
| 2009/0256901 A1 | 10/2009 | Mauchly et al. |
| 2009/0292999 A1 | 11/2009 | LaBine et al. |
| 2009/0309846 A1 | 12/2009 | Trachtenberg et al. |
| 2010/0005142 A1 | 1/2010 | Xiao et al. |
| 2010/0020954 A1* | 1/2010 | Gilg ........................ H04M 3/56 379/202.01 |
| 2010/0061538 A1 | 3/2010 | Coleman et al. |

(56) References Cited

U.S. PATENT DOCUMENTS

| | | |
|---|---|---|
| 2010/0070640 A1 | 3/2010 | Allen, Jr. et al. |
| 2010/0073454 A1 | 3/2010 | Lovhaugen et al. |
| 2010/0094867 A1 | 4/2010 | Badros et al. |
| 2010/0121959 A1 | 5/2010 | Lin et al. |
| 2010/0157978 A1 | 6/2010 | Robbins et al. |
| 2010/0211872 A1 | 8/2010 | Rolston et al. |
| 2010/0245535 A1 | 9/2010 | Mauchly |
| 2010/0262925 A1 | 10/2010 | Liu et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0075830 A1 | 3/2011 | Dreher et al. |
| 2011/0131498 A1 | 6/2011 | Chao et al. |
| 2011/0264928 A1 | 10/2011 | Hinckley |
| 2011/0270609 A1 | 11/2011 | Jones et al. |
| 2011/0271211 A1 | 11/2011 | Jones et al. |
| 2011/0283226 A1 | 11/2011 | Basson et al. |
| 2011/0314139 A1 | 12/2011 | Song et al. |
| 2012/0013704 A1 | 1/2012 | Sawayanagi et al. |
| 2012/0084714 A1 | 4/2012 | Sirpal et al. |
| 2012/0179502 A1 | 7/2012 | Farooq et al. |
| 2012/0190386 A1 | 7/2012 | Anderson |
| 2012/0246229 A1 | 9/2012 | Carr et al. |
| 2012/0246596 A1 | 9/2012 | Ording et al. |
| 2012/0284635 A1 | 11/2012 | Sitrick et al. |
| 2012/0296957 A1 | 11/2012 | Stinson et al. |
| 2012/0306757 A1 | 12/2012 | Keist et al. |
| 2012/0306993 A1 | 12/2012 | Sellers-Blais |
| 2013/0038675 A1 | 2/2013 | Malik |
| 2013/0047093 A1 | 2/2013 | Reuschel et al. |
| 2013/0050398 A1 | 2/2013 | Krans et al. |
| 2013/0063542 A1 | 3/2013 | Bhat et al. |
| 2013/0090065 A1 | 4/2013 | Fisunenko et al. |
| 2013/0091205 A1 | 4/2013 | Kotler et al. |
| 2013/0091440 A1 | 4/2013 | Kotler et al. |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0185672 A1 | 7/2013 | McCormick et al. |
| 2013/0198629 A1 | 8/2013 | Tandon et al. |
| 2013/0215215 A1 | 8/2013 | Gage et al. |
| 2013/0219278 A1 | 8/2013 | Rosenberg |
| 2013/0222246 A1 | 8/2013 | Booms et al. |
| 2013/0225080 A1 | 8/2013 | Doss et al. |
| 2013/0227433 A1 | 8/2013 | Doray et al. |
| 2013/0290421 A1 | 10/2013 | Benson et al. |
| 2013/0297704 A1 | 11/2013 | Alberth, Jr. et al. |
| 2013/0300637 A1 | 11/2013 | Smits et al. |
| 2013/0329865 A1 | 12/2013 | Ristock et al. |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040819 A1 | 2/2014 | Duffy |
| 2014/0068452 A1 | 3/2014 | Joseph et al. |
| 2014/0078182 A1 | 3/2014 | Utsunomiya |
| 2014/0108486 A1 | 4/2014 | Borzycki et al. |
| 2014/0157338 A1 | 6/2014 | Pearce |
| 2014/0161243 A1 | 6/2014 | Contreras et al. |
| 2014/0198175 A1 | 7/2014 | Shaffer et al. |
| 2014/0237371 A1 | 8/2014 | Klemm et al. |
| 2014/0280595 A1 | 9/2014 | Mani et al. |
| 2014/0282213 A1 | 9/2014 | Musa et al. |
| 2014/0317561 A1 | 10/2014 | Robinson et al. |
| 2014/0351327 A1 | 11/2014 | Huang et al. |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0029301 A1 | 1/2015 | Nakatomi et al. |
| 2015/0067552 A1 | 3/2015 | Leorin et al. |
| 2015/0074189 A1 | 3/2015 | Cox et al. |
| 2015/0081885 A1 | 3/2015 | Thomas et al. |
| 2015/0085060 A1 | 3/2015 | Fish et al. |
| 2015/0089393 A1 | 3/2015 | Zhang et al. |
| 2015/0089394 A1 | 3/2015 | Chen et al. |
| 2015/0113050 A1 | 4/2015 | Stahl |
| 2015/0172120 A1 | 6/2015 | Dwarampudi et al. |
| 2015/0201087 A1* | 7/2015 | Volcker ............... H04M 9/082 |
| | | 379/202.01 |
| 2015/0304120 A1 | 10/2015 | Xiao et al. |
| 2015/0304366 A1 | 10/2015 | Bader-Natal et al. |
| 2015/0319113 A1 | 11/2015 | Gunderson et al. |
| 2015/0373063 A1 | 12/2015 | Vashishtha et al. |
| 2016/0044159 A1 | 2/2016 | Wolff et al. |
| 2016/0050079 A1 | 2/2016 | Martin De Nicolas et al. |
| 2016/0050160 A1 | 2/2016 | Li et al. |
| 2016/0050175 A1 | 2/2016 | Chaudhry et al. |
| 2016/0072862 A1 | 3/2016 | Bader-Natal et al. |
| 2016/0094593 A1 | 3/2016 | Priya |
| 2016/0105345 A1 | 4/2016 | Kim et al. |
| 2016/0110056 A1 | 4/2016 | Hong et al. |
| 2016/0173537 A1 | 6/2016 | Kumar et al. |
| 2016/0182580 A1 | 6/2016 | Nayak |
| 2016/0189733 A1* | 6/2016 | Vasilieff ............... G10L 25/78 |
| | | 348/77 |
| 2016/0277461 A1 | 9/2016 | Sun et al. |
| 2016/0283909 A1 | 9/2016 | Adiga |
| 2016/0307165 A1 | 10/2016 | Grodum et al. |
| 2016/0309037 A1 | 10/2016 | Rosenberg et al. |
| 2017/0006162 A1 | 1/2017 | Bargetzi et al. |
| 2017/0006446 A1 | 1/2017 | Harris et al. |
| 2017/0070706 A1 | 3/2017 | Ursin et al. |
| 2017/0104961 A1 | 4/2017 | Pan et al. |
| 2017/0324850 A1 | 11/2017 | Snyder et al. |

FOREIGN PATENT DOCUMENTS

| | | |
|---|---|---|
| CN | 102655583 | 9/2012 |
| CN | 102938834 | 2/2013 |
| CN | 103141086 | 6/2013 |
| CN | 204331453 | 5/2015 |
| EP | 959585 | 11/1999 |
| EP | 2341686 | 8/2016 |
| WO | WO 2012/167262 | 12/2012 |
| WO | WO 2014/118736 | 8/2014 |

OTHER PUBLICATIONS

Author Unknown, "A Primer on the H.323 Series Standard," Version 2.0, available at http://www.packetizer.com/voip/h323/papers/primer/, retrieved on Dec. 20, 2006, 17 pages.

Author Unknown, ""I can see the future" 10 predictions concerning cell-phones," Surveillance Camera Players, http://www.notbored.org/cell-phones.html, Jun. 21, 2003, 2 pages.

Author Unknown, "Active screen follows mouse and dual monitors," KDE Community Forums, Apr. 13, 2010, 3 pages.

Author Unknown, "Implementing Media Gateway Control Protocols" A RADVision White Paper, Jan. 27, 2002, 16 pages.

Author Unknown, "Manage Meeting Rooms in Real Time," Jan. 23, 2017, door-tablet.com, 7 pages.

Averusa, "Interactive Video Conferencing K-12 applications," "Interactive Video applications" copyright 2012. http://www.averusa.com/education/downloads/hvc Conferencing K-12 brochure goved.pdf (last accessed Oct. 11, 2013).

Cisco Systems, Inc., "Cisco WebEx Meetings Server System Requirements release 1.5." 30 pages, Aug. 14, 2013.

Cisco White Paper, "Web Conferencing: Unleash the Power of Secure, Real-Time Collaboration," pp. 1-8, 2014.

Clarke, Brant, "Polycom Announces RealPresence Group-Series," "Polycom Announces RealPresence Group Series" dated Oct. 8, 2012 available at http://www.323.tv/news/polycom-realpresence-group-series (last accessed Oct. 11, 2013).

Clauser, Grant, et al., "Is the Google Home the voice-controlled speaker for you?," The Wire Cutter, Nov. 22, 2016, pp. 1-15.

Cole, Camille, et al., "Videoconferencing for K-12 Classrooms," Second Edition (excerpt), http://www.iste.org/docs/excerpts/VIDCO2-excerpt.pdf (last accessed 1011-2013), 2009.

Epson, "BrightLink Pro Projector," BrightLink Pro Projector. http://www.epson.com/cqi-bin/Store/jsp/Landing/brightlink-pro-interactive-projectors.do?ref=brightlink-pro—dated 2013 (last accessed 10-112013).

(56) References Cited

OTHER PUBLICATIONS

Infocus, "Mondopad," Mondopad. http://www.infocus.com/sites/default/files/InFocus-Mondopad-INF5520a-INF7021-Datasheet-EN.pdf (last accessed Oct. 11, 2013), 2013.

MacCormick, John, "Video Chat with Multiple Cameras," CSCW '13, Proceedings of the 2013 conference on Computer supported cooperative work companion, pp. 195-198, ACM, New York, NY, USA, 2013.

Microsoft, "Positioning Objects on Multiple Display Monitors," Aug. 12, 2012, 2 pages.

Mullins, Robert, "Polycom Adds Tablet Videoconferencing," Mullins, R. "Polycom Adds Tablet Videoconferencing" available at http://www.informationweek.com/telecom/unified-communications/polycom-adds-tablet-videoconferencing/231900680 dated Oct. 12, 2011 (last accessed Oct. 11, 2013).

Nu-Star Technologies, "Interactive Whiteboard Conferencing," Interactive Whiteboard Conferencing. http://www.nu-star.com/interactive-conf.php dated 2013 (last accessed Oct. 11, 2013).

Polycom, "Polycom RealPresence Mobile: Mobile Telepresence & Video Conferencing," http://www.polycom.com/products-services/hd-telepresence-video-conferencing/realpresence-mobile.html#stab1 (last accessed Oct. 11, 2013).

Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Videop Collaboration—http://www.polycom.com/company/news/press-releases/2011/20111027 2.html—dated Oct. 27, 2011.

Polycom, "Polycom UC Board, Transforming ordinary surfaces into virtual whiteboards" Inc., San Jose, CA, http://www.uatg.com/pdf/polycom/polycom-uc-board- datasheet.pdf, 2012, Polycom, (last accessed Oct. 11, 2013).

Stevenson, Nancy, "Webex Web Meetings for Dummies" 2005, Wiley Publishing Inc., Indianapolis, Indiana, USA, 339 pages.

Stodle. Daniel, et al., "Gesture-Based, Touch-Free Multi-User Gaming on Wall-Sized, High-Resolution Tiled Displays," 2008, 13 pages.

Thompson, Phil, et al., "Agent Based Ontology Driven Virtual Meeting Assistant," Future Generation Information Technology, Springer Berlin Heidelberg, 2010, 4 pages.

TNO, "Multi-Touch Interaction Overview," Dec. 1, 2009, 12 pages.

Toga, James, et al., "Demystifying Multimedia Conferencing Over the Internet Using the H.323 Set of Standards," Intel Technology Journal Q2, 1998, 11 pages.

Ubuntu, "Force Unity to open new window on the screen where the cursor is?" Sep. 16, 2013, 1 page.

VB Forums, "Pointapi," Aug. 8, 2001, 3 pages.

Vidyo, "VidyoPanorama," VidyoPanorama-http://www.vidyo.com/products/vidyopanorama/ dated 2013 (last accessed Oct. 11, 2013).

\* cited by examiner

ACOUSTIC ECHO CANCELLATION BASED SUB BAND DOMAIN ACTIVE SPEAKER DETECTION FOR AUDIO AND VIDEO CONFERENCING APPLICATIONS

CROSS REFERENCE TO RELATED APPLICATIONS

This application claims benefit to U.S. provisional application No. 62/579,623, filed on Oct. 31, 2017, which is expressly incorporated by reference herein in its entirety.

TECHNICAL FIELD

The present disclosure relates generally to detection of active speakers in a two-way audio conferencing system.

BACKGROUND

In an audio and video conferencing system with multiple participants attending from different locations, the capability and the accuracy of detecting an active speaker can substantially improve user audio experience, especially when there is undesirable background noise from participants who are not actively engaged in conversation. For example, if a participant joins a conference call from a noisy environment, undesirable noise will be sent to all the participants and could degrade performance or even make the intelligibility of the conferencing call impossible. In this case, if the system could reliably detect the participant as non-active, it could either automatically mute the participant or send a message to the participant regarding the undesirable background noise.

Traditionally, active speaker detection is performed by detecting the energy level and voice activity (VAD) in speech signals. In a controlled environment with stationary and foreseeable background noise, the traditional way to detect an active speaker yields reasonably good performance. However, in live calls, the background noise is rarely stationary or foreseeable. An additional problem is that in a two-way audio conferencing system, echo is commonly detected as an active speaker. Thus, there is a need to accurately determine whether speaker detection is contaminated by background noise and/or echo in a two-way audio system.

DESCRIPTION OF EXAMPLE EMBODIMENTS

Various examples of the present technology are discussed in detail below. While specific implementations are discussed, it should be understood that this is done for illustration purposes only. A person skilled in the relevant art will recognize that other components and configurations may be used without parting from the spirit and scope of the present technology as described and explained with additional specificity and detail through the use of the accompanying drawings in which.

OVERVIEW

Systems, methods, and devices are disclosed for detecting an active speaker in a two-way conference. Real time audio in one or more sub band domains are analyzed according to an echo cancellor model. Based on the analyzed real time audio, one or more audio metrics are determined from an acoustic echo cancellation linear filter. The one or more audio metrics are weighted based on a priority, and a speaker status is determined based on the weighted one or more audio metrics that are analyzed according to an active speaker detection model. The speaker status determination is based on a hysteresis model that stabilizes the speaker status over a period of time. When there's an active speaker determination, one or more residual echo or noise is removed from the real time audio based on the one or more audio metrics.

EXAMPLE EMBODIMENTS

The disclosed technology addresses the need in the art for determining whether speaker detection is contaminated by background noise (which is rarely stationary and foreseeable) and echo in a two-way audio system. In other words, it is hard to detect who's the main or active speaker instead of the echo from another participant. While voice energy can be reviewed in an attempt to identify the echo, it is still hard to differentiate echo from a true active speaker.

This problem is solved by calculating audio metrics from microphone data within one or more sub band domains through an acoustic echo canceller (AEC), which are then fed into an active speaker detector (ASD). The audio metrics (or echo cancellation metrics) can be used as a way to detect speakers within the conference call while decoupling noise and echo. For example, cross-correlated audio metrics can decouple background noise from residual echo not taken out by the first pass of an AEC filter. The audio metrics can be weighted by how relevant they are to speaker detection (and, for example, machine learning can be used to determine weighting as well). The weighted audio metrics are then used to predict whether the participant is speaking. If the participant is speaking, the residual echo and/or background noise is removed. However, in other cases, another participant may have been incorrectly identified as active (because of, e.g., residual echo), and that participant can be switched off.

Figure 1:
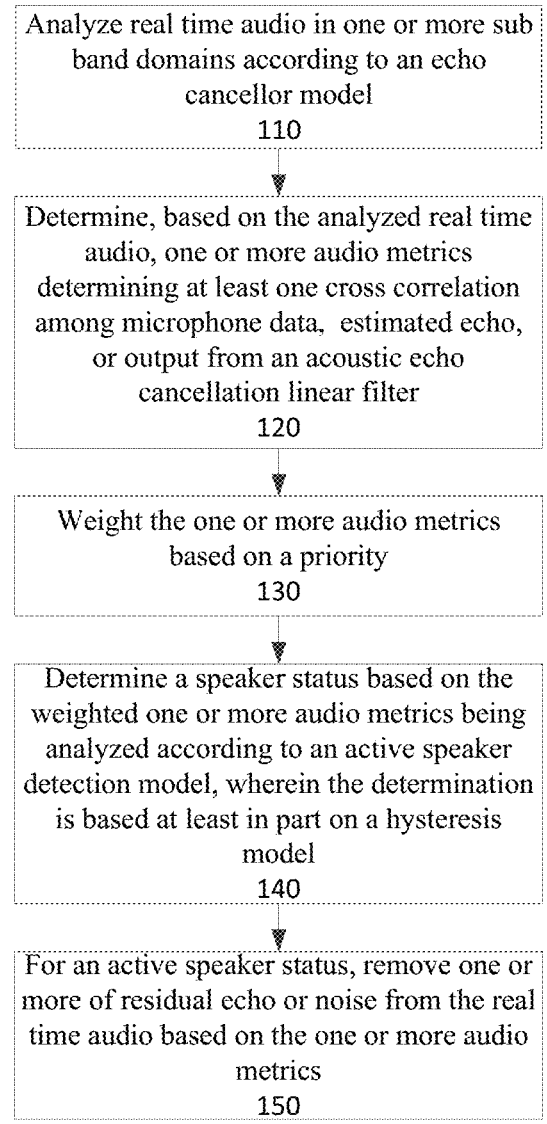
FIG. 1 is a flow chart illustrating an example embodiment for detecting an active speaker in a two-way conference.

FIG. 1. is a flow chart illustrating an example embodiment for detecting an active speaker in at least a two-way conference. Detecting an active speaker begins by detecting or capturing audio from one or more speakers participating in a two way conference. For example, a joint Acoustic Echo Cancellation (AEC) and active speaker detection (ASD) architecture, in which audio metrics computed by the AEC can be used in active speaker detection, can detect an active speaker in one or more sub band domains while also simultaneously decoupling additions to the audio created by residual echo and/or noise.

For example, the audio can be analyzed in one or more sub band domains according to one or more echo cancellor models (step 110). One or more audio metrics are determined based on the analyzed audio, as well as cross correlations among the audio data and/or metrics (step 120). For example, computed audio metrics can be an audio energy level, background noise level, signal to noise ratio (SNR), VAD, pitch analysis. Cross correlations among the microphone data, the estimated echo, and the AEC liner filter output can also be determined. Thus, the audio metrics used in the active speaker detection can, together with cross correlations, determine an active speaker status (e.g., a status of active vs. non-active) despite noise or echo being present.

In some embodiments, the one or more audio metrics can be weighted based on a priority (step 130), such as different weights based on each metric's importance to the active speaker determination. In some embodiments, machine learning (ML) technology is used to optimize the weighting. For example, since the number of audio metrics computed in each sub band domain can be overwhelmingly large, manually choosing an optimum set of the weights for those metrics is not possible. Therefore, ML based data training is used to select those weights for optimal active speaker detection performance.

Accordingly, the speaker status can be determined based on the weighted one or more audio metrics (step 140), which are analyzed according to one or more active speaker detection models. The speaker detection models can, for example, estimate the likelihood of speaker status in real time by providing a statistical determination within some range of confidence. For example, the active speaker detection model can estimate that a participant has a 98% chance of speaking with 90% confidence.

Moreover, while the weighted audio metrics are used to estimate speaker activity, the likelihood of a participant being an active speaker can also be affected based on a hysteresis model that prevents the speaker status from toggling between active and non-active. In some embodiments, the audio metrics can influence the speed of hysteresis as well (e.g., more heavily weighted audio metrics will slow down the speed of hysteresis and vice versa). Thus, instantaneous active speaker status can determined based on the value of the likelihood of speaker activity while being stabilized by the hysteresis model, as well as portions of the audio that indicate noise and/or echo.

If a participant is determined to be an active speaker (e.g., the status is determined to be active), the residual echo or noise is removed from the audio in real time (step 150).

Figure 2:
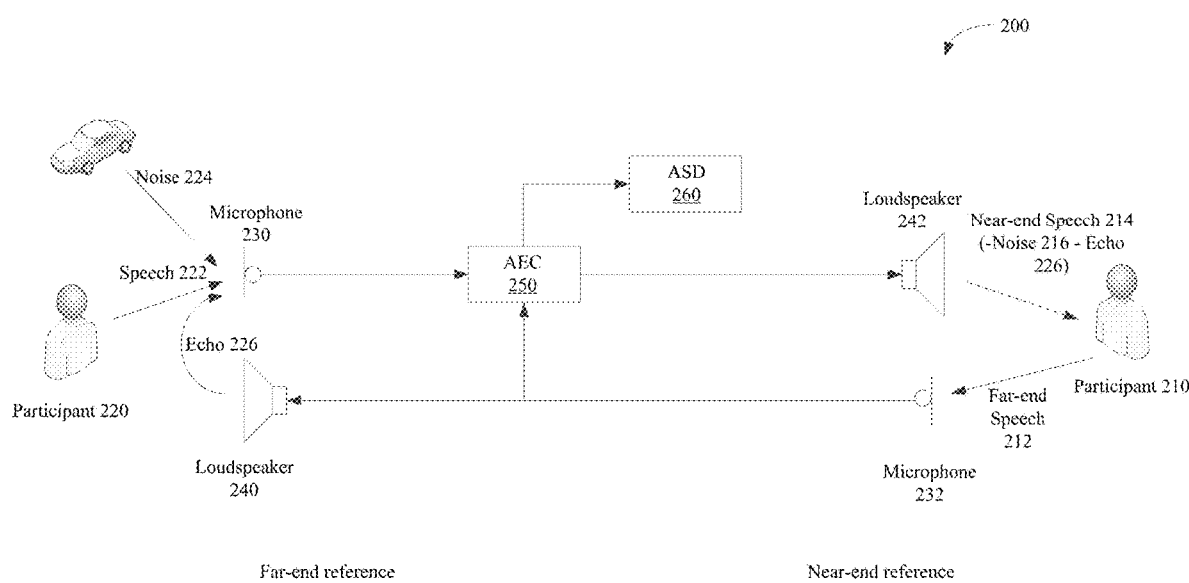
FIG. 2 shows an example embodiment of an acoustic echo canceller (AEC) based active speaker detection (ASD) system.

FIG. 2 shows an example embodiment of an acoustic echo canceller (AEC) based active speaker detection system in more detail. System 200 is an AEC-based active speaker detection architecture used in the audio conferencing system including participant 210 at a near end reference (microphone 232 and loudspeaker 242) and participant 220 at a far end reference (microphone 230 and loudspeaker 240).

When participant 210 talks, speech (far-end speech 212) is played out through loudspeaker 240 on participant 220's side. Participant 220's microphone (microphone 230) picks up the audio signal from participant 220 (who may or may not be speaking as well), background noise surrounding participant 220 (e.g., noise 224), and participant 210's speech either directly from loudspeaker 240 or from echo 226 caused in part by multiple reflections in the room. If left untreated, in addition to noise 224 contaminating the audio picked up by microphone 230, participant 210's speech is also sent back to participant 210, known as "residual echo" (e.g., echo 218). However, most, if not all, of echo 218 and/or noise 224 can be removed by AEC 250 and/or ASD 260 working together. Accordingly, when participant 220 produces speech 222, their speech (near-end speech 214) is played out through loudspeaker 242 minus noise 216 and echo 218 from far-end speech 212.

In some embodiments, AEC 250 estimates and cancels echo linearly or nonlinearly, detects near-end speech 214 and/or far-end speech 212, tracks background noise level (noise 224), and reduces the background noise. In some embodiments, AEC 250 can add sophistication by performing VAD and pitch analysis for speech. Some metrics computed in AEC 250, such as near-end speech 214, noise 224, echo 226, VAD, pitch, and cross correlations between near-end speech 214 and echo 226, can be used to detect one or more active speakers.

For example, in audio and video conferencing systems, in addition to far-end speech 212, echo 226 is also captured by microphone 230. Echo 226 is undistinguishable from far-end speech 212; thus, echo 226 can be erroneously detected as an active speaker. Moreover, An architecture that uses AEC output alone suffers numerous problems. For example, speech is distorted after AEC 250 performs nonlinear processing when participants at both ends speak at the same time. In addition, since the conference environment includes background noise 224, depending on the noise level, the noise reduction in AEC 250 alone can potentially distort the speech further. Distortion in speech either by nonlinear processing or by noise reduction makes it difficult to reliably detect the active speaker status.

However, an AEC-based active speaker detection architecture, which feeds metrics calculated by AEC 250 into ASD 260, has significantly less echo and does not have speech distortion problems caused by nonlinear processing and noise reduction. Audio metrics computed by AEC, which in some embodiments can be associated with AEC linear filter output, can be used to detect speaker activity and to control the speed of hysteresis. To smooth out the time variant nature of speech and background noise, hysteresis is used to prevent speaker status from toggling between active and non-active.

For example, the AEC-based active speaker detection architecture (system 200) can be a detection architecture in a sub band domain, rather than broadband, where the audio metrics computed by AEC 250 is fed into the models within ASD 260. Sub band signal processing, for example, breaks a signal into a number of different frequency bands (typically through use of a fast Fourier transform), and processes each one independently. The decomposition allows for more targeted processing specific to each band, such that contamination by noise and/or echo can be determined and removed within each sub band, rather than carte blanche across the entire broadband signal. The processing can also include cross correlations among echo 226, microphone data, and linear AEC output per sub band, background noise state, echo state, VAD, and pitch state in the linear AEC output, described below in equations (1)-(13). Audio metrics can be weighted according to equations (14)-(26), although in some embodiments, weights can be better chosen through machine learning (ML) techniques. Speaker activity likelihood is computed from weighted audio metrics in equation (27), and equation (29) describes how hysteresis is used to stabilize active speaker status.

Figure 3:
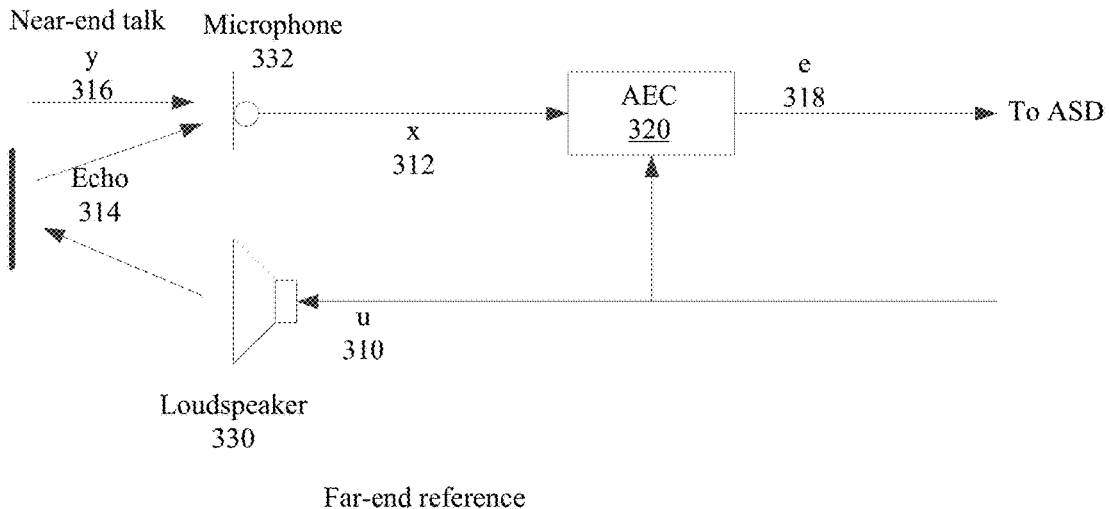
FIG. 3 illustrates an example embodiment of AEC operation.

FIG. 3 illustrates an example embodiment of AEC operation in a sub band domain while both the near- and far-end participants are speaking at the same time (known as "double talk"). In this example, u 310 is far-end audio data (from, e.g., far-end speech 212) in a discrete time domain, u(t), with t>0 representing discrete time indexes. A block of {u(t)} samples, for example, can be sent to both the AEC adaptive filter 320 and loudspeaker 330 to be played out. After sub band transformation, data in the sub band domain is represented by {U(n,k)} where n is frame index and k is sub band index.

X 312 is signal captured by microphone 332 in a discrete time domain, x(t), also known as microphone input data. It consists of echo 314, near-end talk y 316, and noise. The sub band domain representation is {X(n,k)}. Echo 314 is echo in the system d(t), and y 316 is near-end talk y(t). E 318 is AEC linear filter output 320 in a discrete time domain, e(t), commonly referred to as "error signal" in adaptive signal processing. Note that e(t) consists of residual echo, near-end speech 316, and noise. Sub band domain representation is {e(n,k)}.

The duration of an impulse response of an acoustic echo varies from a few tens of milliseconds (ms) to a few hundreds of ms. With such long impulse response of the acoustic echo, the echo cancellation filter used to model the impulse response of the echo needs a large number of filter coefficients (also known as taps) if AEC 320 is to be implemented in discrete time domains. A filter with a large number of filter taps not only requires high computational power but also potentially injects noise into the system during mathematical operations. However, this is minimized and reduced when AEC 320 is implemented in one or more sub band domains.

In a packetized audio communication system, a fixed length of audio samples are grouped into one packet, known as a frame. For AEC 320 operating in a sub band domain, discrete time domain data {u(t)} and {x(t)} from the current frame are transformed to sub band domains {U(n,k)} and {X(n,k)} before they are processed by AEC 320. The transformation from the time domain to the frequency domain (such as the sub band domains) can be accomplished in any number of ways, including a Fourier transform or similar variants.

The input data to AEC 320 can consist of near-end talk 316, background noise, and echo 314. With a double talk detector, AEC 320 can reliably determine whether the audio signal consists of near-end talk 316, background noise, echo, or a combination of them.

In practice, a linear filter by itself is not able to completely cancel all echo 314; therefore, output from AEC 320 (e.g., from AEC linear filter, {e(n,k)}), consists of near-end talk 316, background noise, and residual echo. This is sent to ASD for further processing on active speaker detection (e.g., whether a participant is active vs. non-active).

Figure 4:
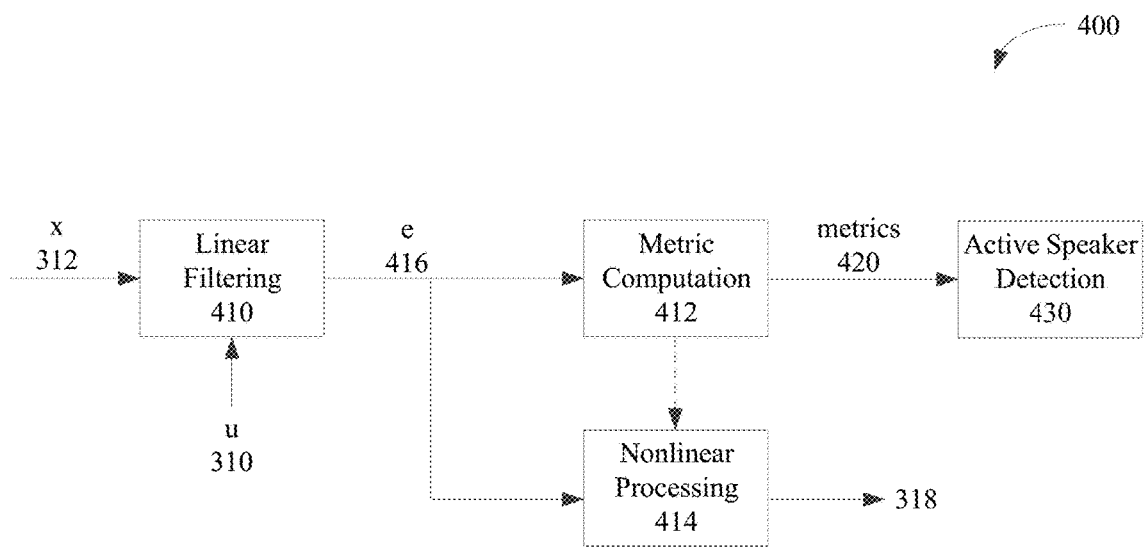
FIG. 4 shows an diagram of an example AEC signal flow used in some embodiments.

FIG. 4 shows a diagram of an example AEC signal flow used in some embodiments. In this example, AEC 400 cancels echo linearly without distorting speech. AEC 400 takes in x 312 (e.g., microphone 332 data) and u 310 (e.g., far-end speech data) as input to perform linear filtering 410, which, as in FIG. 3, produces linear filter output e 416 consisting of microphone data (x 316), background noise, and residual echo.

The linear filter output 416 is provided to metric computation unit 412, which computes one or more metrics 420 and cross correlations among microphone data {X(n,k)}, far end data {U(n,k)}, linear filter output {e(n,k)}, pitch, VAD analysis on {e(n,k)}, noise tracking statistics, near-end talk state, and/or echo state. For example, metrics 420 can include, but is not limited to: the power level of microphone data; the power level of the linear filter output per sub band and full band; cross correlations among the data, such as cross correlations between the microphone data, estimated echo, and the linear filter output per sub band; the presence of echo in the system; VAD and pitch frequency on the linear filter output; noise flag; noise level; and the SNR.

For example, the kth sub band power level of the microphone data at the nth frame is computed by:

$$P_{xx}(n,k)=E[x(n,k)x^T(n,k)], \quad (1)$$

The sub band power level of the linear filter output is computed by:

$$P_{ee}(n,k)=E[e(n,k)e^T(n,k)], \quad (2)$$

The full band power for microphone data and for the linear filter output at the nth frame are:

$$P_{xx}(n)=\Sigma_k P_{xx}(n,k), \quad (3)$$

$$P_{ee}(n)=\Sigma_k P_{ee}(n,k). \quad (3)$$

Cross correlations between the microphone data and estimated echo for the kth sub band at the nth frame is computed as follows, where E[ ] represents the statistical operation of expectation:

$$C_{xd}(n,k)=E[x(n,k)d^T(n,k)], \quad (5)$$

Similarly, the cross correlation between the microphone data and the linear filter output is computed by:

$$C_{xe}(n,k)=E[x(x,k)e^T(n,k)], \quad (6)$$

The cross correlation between estimated echo and linear filter output can be computed by:

$$C_{de}(n,k)=E[d(n,k)e^T(n,k)], \quad (7)$$

The VAD metric is associated with the likelihood of having speaker activity in a frame, where the likelihood is a rational number between 0 and 1. A value of 0 means no speaker activity, and a value of 1 means the presence of speech with 100% confidence.

$$\text{vad}(n)=a \text{ value from 0 to 1}, \quad (8)$$

The pitch metric is an integer number of 0 or 1. A value of 0 indicates there is no pitch, while a value of 1 indicates the presence of the pitch.

$$\text{pitch}(n)=0 \text{ or } 1, \quad (9)$$

The echo flag metric is an integer number of 0 or 1. A value of 0 means absence of echo, while a value of 1 indicates presence of echo.

$$\text{ef}(n)=0 \text{ or } 1, \quad (10)$$

The noise flag metric is an integer number of 0 or 1. A value of 0 means absence of noise, while a value of 1 indicates presence of noise.

$$\text{nf}(n)=0 \text{ or } 1, \quad (11)$$

The full band noise level at the nth frame is:

$$P_{nn}(n)=\Sigma_k E[\text{noise}(n,k)\text{noise}^T(n,k)], \quad (12)$$

The signal to noise ratio, SNR, at nth frame is computed by:

$$SNR(n) = \frac{P_{ee}(n)}{P_{nn}(n)}, \quad (13)$$

Nonlinear processing unit 414 further removes residual echo and reduces noise nonlinearly per sub band controlled by the audio metrics supplied by metric computation unit 412. For example, nonlinear processing unit 414 can determine which portions of the audio signal are produced by noise or residual echo, and then subtract those portions from the signal. The output is sent to ASD unit 430 for determining active vs. non-active speakers. In some embodiments, metric computation unit 412 computes audio metrics, and then the audio metrics are used to control the operation of nonlinear processing in nonlinear processing unit 414.

Metrics 420 are then passed to active speaker detection unit 430 for further processing.

Figure 5:
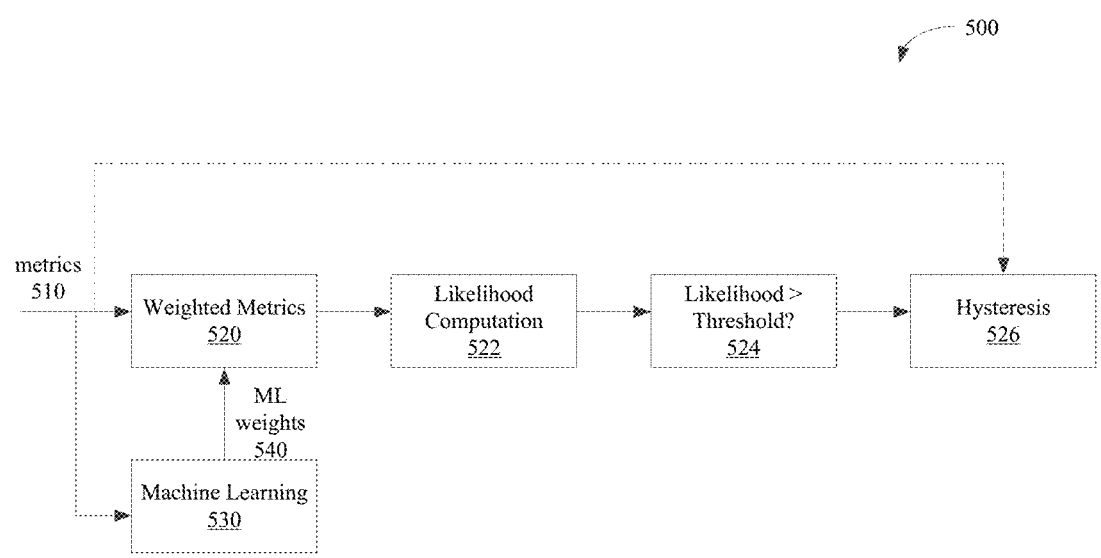
FIG. 5 shows a diagram of an example embodiment of active speaker detection signal flow.

FIG. 5 shows a diagram of an example embodiment of active speaker detection signal flow after the metrics have been received from the AEC. ASD 500 takes metrics 510 computed by the AEC for use in active speaker detection operation. Metrics 510 can include, but is not limited to: the power level of microphone data; the power level of the linear filter output per sub band and full band; cross correlations among the data, such as cross correlations between the microphone data, estimated echo, and the linear filter output per sub band; the presence of echo in the system; VAD and pitch frequency on the linear filter output; noise flag; noise level; and the SNR.

Metrics 510 used by ASD 500 may vary, and/or may dynamically determine which metrics are more useful for the current circumstances. VAD, for example, can be used to estimate the likelihood of speech. Pitch analysis can also be used to estimate the likelihood of speech, sometimes with a higher reliability. VAD alone has a higher false positive rate, meaning noise is falsely detected as speech. Pitch analysis can substantially reduce the likelihood of false positives but at the expense of missing speech detection.

Weighted metrics unit 520 performs metrics weighting. The importance/priority of sub band and full band metrics is different when used in active speaker detection. In order to account for this difference in importance, weighted metrics unit 520 uses a normalized weighting. For example, each metric is assigned a weight of a value from 0 to 1. A weight of 1 signifies that this metric plays a crucial role in detecting an active speaker. A weight of 0 signifies that this metric is not used to detect speaker activity.

The weighted speaker activity metrics are computed as follows, where the weighted audio metrics in equations (14)-(18) are sub band based, and the weighted audio metrics in Equations (19)-(26) are for the full band:

The weighted microphone data power level for the kth sub band is computed by equation (14) where $W_{xx\_subband}(k)$ is the weight applied to the microphone data power level for the kth sub band at the nth frame.

$$P_{xx}^{W}(n,k) = W_{xx\_subband}(k) * P_{xx}(n,k), \quad (14)$$

The weighted linear filter output power level for the kth sub band is:

$$P_{ee}^{W}(n,k) = W_{ee\_subband}(k) * P_{ee}(n,k), \quad (15)$$

The weighted correlation between the microphone data and estimated echo for the kth sub band is:

$$C_{xd}^{W}(n,k) = W_{cxd\_subband}(k) * C_{xd}(n,k), \quad (16)$$

The weighted correlation between the microphone data and the filter output for the kth sub band is:

$$C_{xe}^{W}(n,k) = W_{cxe\_subband}(k) * C_{xe}(n,k), \quad (17)$$

The weighted correlation between estimated echo and the filter output for the kth sub band is:

$$C_{de}^{W}(n,k) = W_{cde\_subband}(k) * C_{de}(n,k), \quad (18)$$

For full band metrics, the weighted metrics are computed as follows:

The weighted microphone data power level is:

$$P_{xx}^{W}(n) = W_{xx\_fullband} * P_{xx}(n), \quad (19)$$

The weighted filter output power level is:

$$P_{ee}^{W}(n) = W_{xx\_fullband} * P_{xx}(n), \quad (20)$$

The weighted noise power level is:

$$P_{nn}^{W}(n) = W_{nn\_fullband} * P_{nn}(n), \quad (21)$$

The weighted voice activity flag is:

$$vad^{W}(n) = W_{vad} * vad(n), \quad (22)$$

The weighted pitch flag is:

$$pitch^{W}(n) = W_{pitch} * pitch(n), \quad (23)$$

The weighted echo flag is:

$$ef^{W}(n) = W_{ne} * ef(n), \quad (24)$$

The weighted noise flag is:

$$nf^{W}(n) = W_{nf} * nf(n), \quad (25)$$

The weighted signal to noise ratio is:

$$SNR^{W}(n) = W_{snr} * SNR(n), \quad (26)$$

The weights used in equations (14)-(26) are chosen to maximize the active speaker detection accuracy rate while minimizing false positive rate. In some embodiments, the metrics are weighted according to the determinations from weighted metrics unit 520. However, in alternative embodiments, weights may be supplemented or determined by ML weights 540 received from machine learning unit 530. Machine learning unit 530 uses historical data to determine what metrics to compute, which metrics are most relevant in certain circumstances, and how to maximize accurate speaker detection rates, which will be described more fully below.

Likelihood computation unit 522 computes the likelihood of speaker activity by summing up the weighted metrics received from weighted metrics unit 520 and creating a simple linear model as follows:

$$likelihood(n) = \Sigma_k P_{xx}^{W}(n,k) + \Sigma_k P_{ee}^{W}(n,k) +$$
$$\Sigma_k C_{xd}^{W}(n,k) + \Sigma_k C_{xe}^{W}(n,k) + \Sigma_k C_{de}^{W}(n,k) +$$
$$P_{xx}^{W}(n) + P_{ee}^{W}(n) + P_{nn}^{W}(n) +$$
$$vad^{W}(n) + pitch^{W}(n) + nf^{W}(n) + SNR^{W}(n), \quad (27)$$

While the actual weights may be determined through a combination of heuristics and trial-and-error, in high definition audio conferencing equipment, the total number of weights used in equations (14)-(26) can easily reach the one-thousand mark, making tuning a daunting task. Later sections describe how machine learning can be used to automate this process and create more sophisticated nonlinear models.

An instantaneous active speaker status, ias, at the nth frame by comparing the likelihood against a threshold 524.

$$ias(n) = 1 \text{ if } likelihood(n) \geq threshold,$$
$$ias(n) = 0 \text{ if } likelihood(n) < threshold, \quad (28)$$

The threshold in equation (28) can be a design parameter used to measure the sensitivity of the detection.

Hysteresis unit 526 performs one or more hysteresis functions to smooth out active vs. non-active speaker determinations. Active speaker detection is performed at every frame. It is possible that detected speaker status toggles between active and non-active. For example, without hysteresis functions applied, the status of a speaker who just meets the threshold of detection may jump between active and non-active, causing disruptions within the conferencing system. In order to prevent the toggling of speaker status, hysteresis is used to smooth out the instantaneously detected active speaker status. Hysteresis delays the effect of any changes within the speaker determination, thus stopping unwanted toggling between speaker states.

Hysteresis is implemented by comparing the speaker activity metric, sa, against a threshold. The speaker activity metric is updated from the previous frame by adding instantaneous active speaker status, VAD flag, pitch flag, echo flag and noise flag with different weights. For example:

$$sa(n)=sa(n-1)+hyst\_ias*ias(n)+hyst\_hyst*vad(n)+$$

$$hyst\_pitch*pitch(n)-hyst\_ef*ef(n)-hyst\_nf*nf(n), \quad (29)$$

The stable active speaker is declared if:

$$sa(n)>hyst\_threshold, \quad (30)$$

In embodiments, The constants hyst_ias, hyst_vad, hyst_pitch, hyst_ef and hyst_nf in equation (29) and hyst_threshold in equation (30) are design parameters to control the speed of hysteresis.

Figure 6:
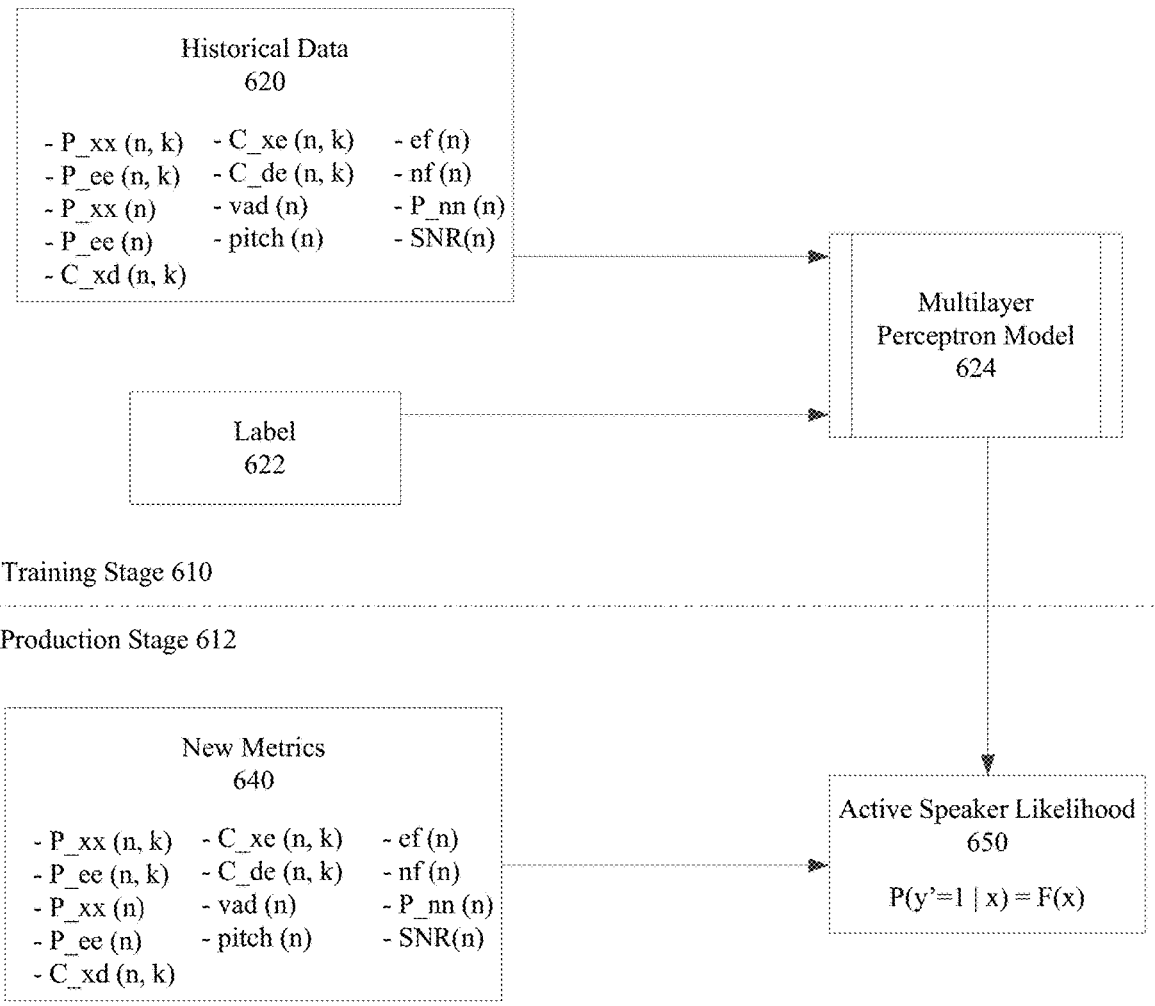
FIG. 6 shows an example process of using a machine learning process to determine the likelihood of an active speaker.

FIG. 6 shows an example process of using a machine learning process to determine the likelihood of an active speaker. A multilayer perceptron (MLP) model, for example, can be used to generate one or more models that calculate the likelihood of an active speaker. The goal of using machine learning is twofold: (1) to automate the discovery of optimal weights and (2) to create more complex non-linear models that are difficult to craft manually through trial and error. A non-linear model has more expressive power that allows more accurate prediction power than equation (27).

In training stage 610, historical data unit 620 includes the historical data of metrics from equations (1)-(13) and the associated ground truth label 622 (e.g., value=1 for active speaker and 0 otherwise). Historical data unit 620 provides the historical data to the Multiplayer Perceptron model 624 for training. Through a learning process driven by backpropagation, the Multiplayer Perceptron model 624 produces one or more models that calculate the likelihood of an active speaker based on the given metrics. These model(s) are then deployed in production stage 612.

In production stage 612, active speaker likelihood service 650 computes the probability that a participant is speaking based on the models received from the Multilayer Perceptron model 624 in conjunction with new metrics 640 computed from current data. New metrics 640 can be current calculations of equations (1)-(13).

Figure 7:
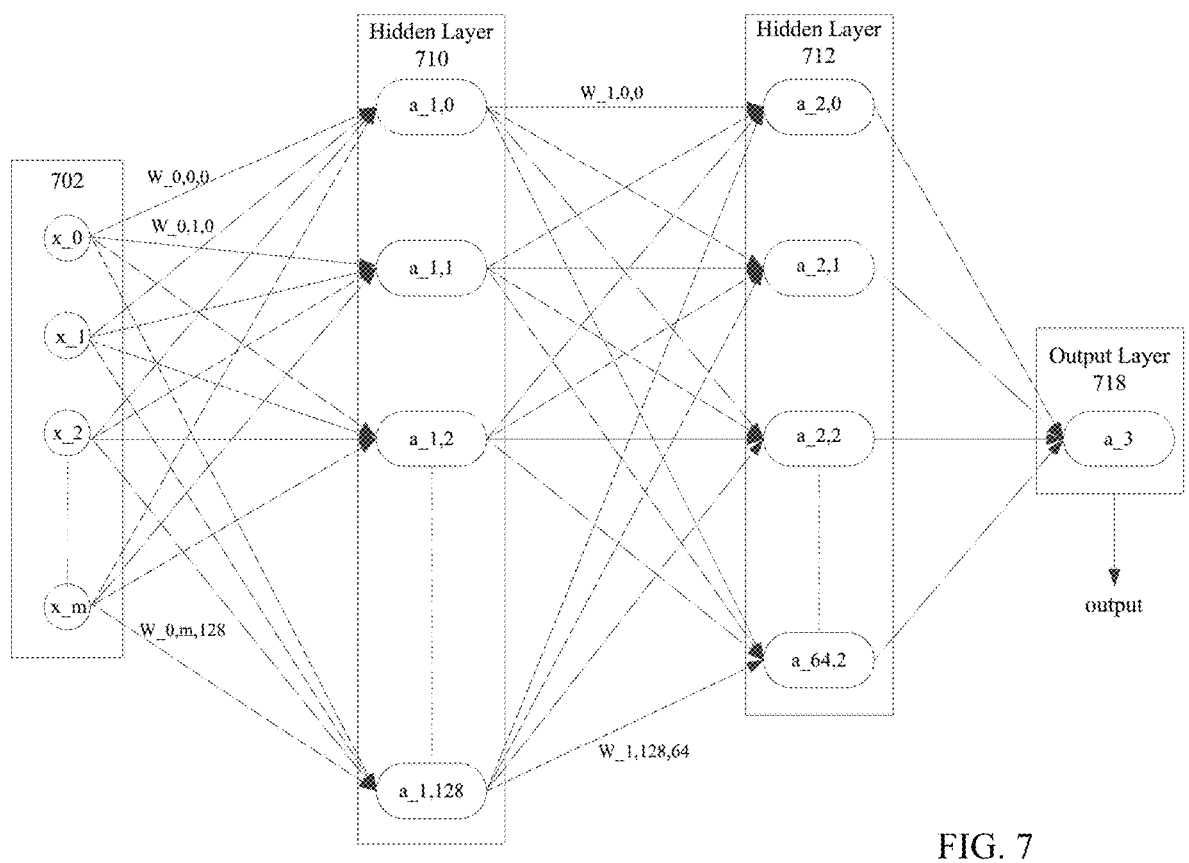
FIG. 7 illustrates an example neural network architecture of some embodiments.

FIG. 7 illustrates an example neural network architecture according to some embodiments. In this example architecture, two hidden layers are used (although one or more can be used in alternative embodiments). Although the number of nodes can vary, in this embodiment the first hidden layer (hidden layer 710) has 128 nodes, and the second hidden layer (hidden layer 712) has 64 nodes. The following illustrates the resulting non-linear model from this neural network after the MLP model 624 (see FIG. 6) learns the optimal weights using backpropagation.

In some embodiments, tan h is used as the activation function for both hidden layers, and sigmoid is used as the activation for the output layer. This particular embodiment, for example, yields accurate prediction performance. Definitions for the following activation functions can be, for example:

$$\text{sigmoid}(z) = \frac{1}{1+e^{-z}}$$

$$\tanh(z) = \frac{e^{2z}-1}{e^{2z}+1}$$

In the following, getting from the metrics (new metrics 640 and/or historical data 620) to the likelihood of Y=1 (i.e. active speaker) is explained. First, each metric 702 from equations (1)-(13) is denoted as x_0, x_1, x_2, ..., x_m, and the learned weights (denoted as W) are applied on these metrics directly in hidden layer 710.

$$a_0^{[1]} = \tanh(W_{0,0}^{[0]}x_0 + W_{1,0}^{[0]}x_1 + \ldots + W_{m,0}^{[0]}x_m)$$

$$a_1^{[1]} = \tanh(W_{0,1}^{[0]}x_0 + W_{1,1}^{[0]}x_1 + \ldots + W_{m,1}^{[0]}x_m)$$

...

$$a_{128}^{[1]} = \tanh(W_{0,128}^{[0]}x_0 + W_{1,128}^{[0]}x_1 + \ldots + W_{m,128}^{[0]}x_m)$$

Then in hidden layer 712, another set of learned weights is applied on the output from hidden layer 710.

$$a_0^{[2]} = \tanh(W_{0,0}^{[1]}a_0^{[1]} + W_{1,0}^{[1]}a_1^{[1]} + \ldots + W_{128,0}^{[1]}a_{128}^{[1]})$$

$$a_1^{[2]} = \tanh(W_{0,1}^{[1]}a_0^{[1]} + W_{1,1}^{[1]}a_1^{[1]} + \ldots + W_{128,1}^{[1]}a_{128}^{[1]})$$

...

$$a_{64}^{[2]} = \tanh(W_{0,64}^{[1]}a_0^{[1]} + W_{1,64}^{[1]}a_1^{[1]} + \ldots + W_{128,64}^{[1]}a_{128}^{[1]})$$

Finally, in output layer 718, the last set of learned weights is applied on the output from hidden layer 712 to calculate the likelihood of the user being an active speaker, this time using sigmoid as the activation function.

$$\text{likelihood } P(y=1)=a^{[3]}=\text{sigmoid}(W_0^{[2]}a_0^{[2]}+ W_1^{[1]}a_1^{[2]}+ \ldots + W_{64}^{[1]}a_{64}^{[2]})$$

Sigmoid produces an output that ranges from 0.1 to 1.0. This can be effectively equation (28). In some embodiments, by default, the threshold is set as 0.5. Output layer 718 can provide the output to the conferencing system.

Figure 8:
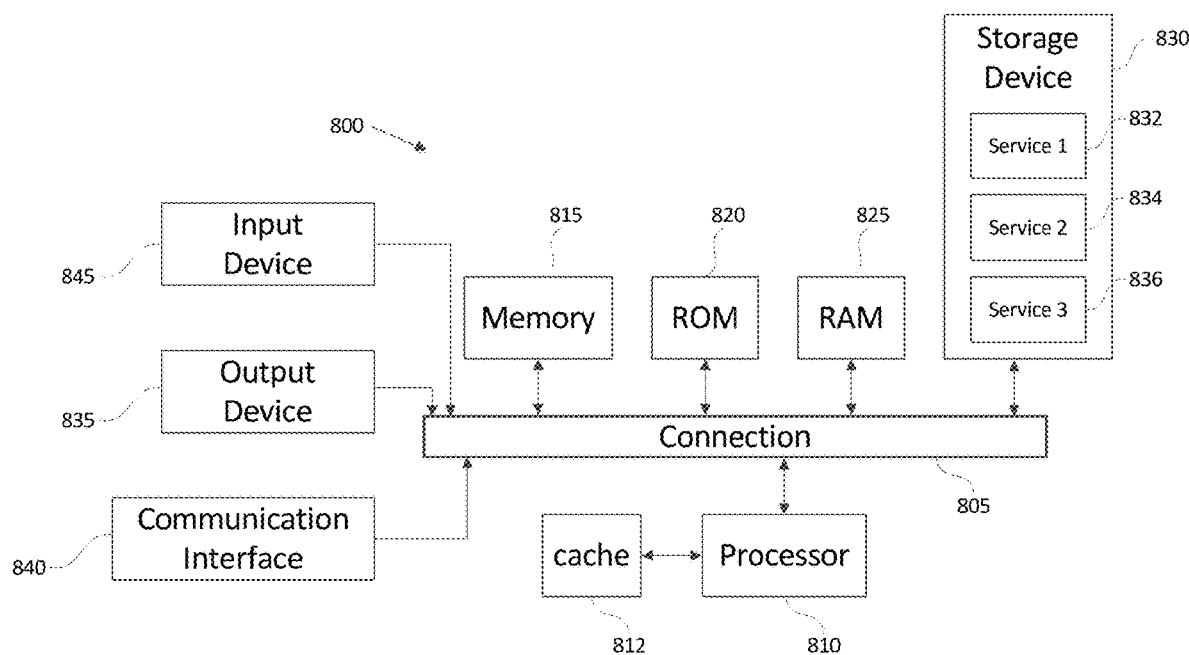
FIG. 8 shows an example of a system for implementing certain aspects of the present technology.

FIG. 8 shows an example of computing system 800 that can be used in combination with the embodiments discussed above. For example, computing system 800 can represent any of the above, or a combination of such devices. In computing system 800 the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) and random access memory (RAM) to processor 810. Computing system 800 can include a cache of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for detecting an active speaker in at least a two-way conference comprising:
   analyzing real time audio in one or more sub band domains according to an echo canceller model, wherein the echo canceller model includes at least in part processing the real time audio using an acoustic echo cancellation linear filter;
   determining, based on the analyzed real time audio, one or more audio metrics;
   weighting, via a trained machine learning model, the one or more audio metrics based on importance of the one or more audio metrics for active speaker determination in the one or more sub band domains;

summing the one or more weighted audio metrics;
comparing the one or more summed weighted audio metrics and a hysteresis threshold;
in response to the one or more summed weighted audio metrics being greater than the hysteresis threshold, determining a speaker status as active; and
in response to the speaker status being active, removing one or more of residual echo or noise from the real time audio based on the weighted one or more audio metrics.

2. The method of claim 1, wherein the one or more of residual echo or noise from the real time audio is removed nonlinearly based on the one or more audio metrics.

3. The method of claim 1, wherein the one or more audio metrics determines the speed of the hysteresis model.

4. The method of claim 1, wherein one or more weights used in weighting the one or more audio metrics is generated dynamically from a machine learned model.

5. The method of claim 1, wherein the one or more audio metrics include cross correlations among two or more of echo, microphone data, linear acoustic echo canceller output per sub band, background noise state, echo state, voice activity, and pitch state.

6. The method of claim 1, wherein the echo canceller model cancels echo linearly without distorting speech.

7. The method of claim 1, wherein the real time audio is captured by a microphone proximate to a participant in the two-way conference.

8. A system for detecting an active speaker in at least a two-way conference comprising:
at least one receiver for receiving real time audio;
a conference server communicatively coupled to the at least one receiver, wherein the conference server is configured to:
analyze the real time audio in one or more sub band domains according to an echo canceller model, wherein the echo canceller model includes at least in part processing the real time audio using an acoustic echo cancellation linear filter;
determine, based on the analyzed real time audio, one or more audio metrics;
weight, via a trained machine learning model, the one or more audio metrics based on importance of the one or more audio metrics for active speaker determination in the one or more sub band domains;
sum the one or more weighted audio metrics;
compare the one or more summed weighted audio metrics and a hysteresis threshold;
in response to the one or more summed weighted audio metrics being greater than the hysteresis threshold, determine a speaker status as active; and
in response to the speaker status being active, remove one or more of residual echo or noise from the real time audio based on the weighted one or more audio metrics; and
a loudspeaker in communication with the conference server configured to output the real time audio.

9. The system of claim 8, wherein the one or more of residual echo or noise from the real time audio is removed nonlinearly based on the one or more audio metrics.

10. The system of claim 8, wherein the one or more audio metrics determines the speed of the hysteresis model.

11. The system of claim 8, wherein one or more weights used in weighting the one or more audio metrics is generated dynamically from a machine learned model.

12. The system of claim 8, wherein the one or more audio metrics include cross correlations among two or more of echo, microphone data, linear acoustic echo canceller output per sub band, background noise state, echo state, voice activity, and pitch state.

13. The system of claim 8, wherein the echo canceller model cancels echo linearly without distorting speech.

14. A non-transitory computer-readable medium containing instructions that, when executed by a computing system, cause the computing system to:
analyze real time audio in one or more sub band domains according to an echo canceller model, wherein the echo canceller model includes at least in part processing the real time audio using an acoustic echo cancellation linear filter;
determine, based on the analyzed real time audio, one or more audio metrics;
weight, via a trained machine learning model, the one or more audio metrics based on importance of the one or more audio metrics for active speaker determination in the one or more sub band domains;
sum the one or more weighted audio metrics;
compare the one or more summed weighted audio metrics and a hysteresis threshold;
in response to the one or more summed weighted audio metrics being greater than the hysteresis threshold, determine a speaker status is active; and
in response to the speaker status being active, remove one or more of residual echo or noise from the real time audio based on the weighted one or more audio metrics.

15. The non-transitory computer-readable medium of claim 14, wherein the one or more of residual echo or noise from the real time audio is removed nonlinearly based on the one or more audio metrics.

16. The non-transitory computer-readable medium of claim 14, wherein the one or more audio metrics determines the speed of the hysteresis model.

17. The non-transitory computer-readable medium of claim 14, wherein one or more weights used in weighting the one or more audio metrics is generated dynamically from a machine learned model.

18. The non-transitory computer-readable medium of claim 14, wherein the one or more audio metrics include cross correlations among two or more of echo, microphone data, linear acoustic echo canceller output per sub band, background noise state, echo state, voice activity, and pitch state.

19. The non-transitory computer-readable medium of claim 14, wherein the echo canceller model cancels echo linearly without distorting speech.

* * * * *